G. O. BERGLAND.
JOURNAL BOX.
APPLICATION FILED SEPT. 2, 1919.

1,345,063.

Patented June 29, 1920.

Witness

Inventor
Gunder O. Bergland
By Ewart Wheeler & Woolard
Attorneys

UNITED STATES PATENT OFFICE.

GUNDER O. BERGLAND, OF DEERFIELD, WISCONSIN.

JOURNAL-BOX.

1,345,063.  Specification of Letters Patent.  Patented June 29, 1920.

Application filed September 2, 1919. Serial No. 321,001.

*To all whom it may concern:*

Be it known that I, GUNDER O. BERGLAND, a citizen of the United States, residing at Deerfield, county of Dane, and State of Wisconsin, have invented new and useful Improvements in Journal-Boxes, of which the following is a specification.

My invention relates to improvements in journal boxes, with particular reference to journal boxes of the general type disclosed in my former Patent No. 1,230,986, dated June 26, 1917, in which I have shown and described a journal box composed of two pieces of sheet metal blanked and shaped in such a manner that the ends of both blanks or pieces of sheet metal may be bolted to a support and a shaft engaged between them at an intermediate point within a substantially cylindrical cavity, partially formed by the lower member, but principally formed by the upper member. A bearing disclosed in my former patent is satisfactory as a bearing for manually operated grindstones, and other places where the conditions are such that little wear takes place, and where the bearing is not subjected to heavy load, nor the shaft to high speed. In said former patent, however, the two plates of which it was composed diverge from the shaft at quite widely separated points, and converge outwardly from the shaft to a meeting point a substantial distance therefrom. The two plates, therefore, formed arcuate bearing surfaces without constituting a full cylindrical bearing.

The object of my present invention is to provide means whereby a pair of sheet metal blanks or members may be stamped and shaped in such a manner as to produce a bearing which is completely cylindrical, or substantially so, at its respective ends, and in which the portions of the bearing formed by the respective sheet metal members will each be substantially semi-cylindrical at the ends of the bearing, the intermediate or middle portion thereof being similar in form to that described in my former patent with the joint or diverging portions of the respective members located below the joints of the semi-cylindrical end portions of the respective members, thus providing a bearing composed of stamped sheet metal members having joints which do not extend longitudinally from one end of the bearing to the other, the joints between the end members being offset upwardly from the joints between the central portions.

In one aspect, therefore, the object of my invention may be stated as directed to the production of a break-joint, two-part bearing from a set or pair of stampings or sheet metal members pressed into the desired shape.

Another object of my invention is to provide a form of construction whereby each of the metal members may be produced from a blank of the required size in a single stamping operation.

A further object of my invention is to produce a bearing which can not only be stamped from sheet metal at small expense, but which will wear true and retain its cylindrical form as well as any other form of bearing.

My invention also has for its object to provide a set of sheet metal bearing members adapted to receive an ordinary Babbitt metal bushing, having in view also, the possibility of so constructing the bearing as to receive semi-cylindrical bushing members in such a manner that the bushing members and the bearing members will break joints in both the end portions and the central portions, this being accomplished by so making the end portions of the lower sheet metal member of the bearing as to form a little more than a half cylinder, the upper member being a little less than a half cylinder at the ends, and a little more than a half cylinder in the middle portion, the lower member being considerably less than a half cylinder in the middle portion.

In the drawings.

Like parts are identified by the same reference characters throughout the several views.

Figure 4:
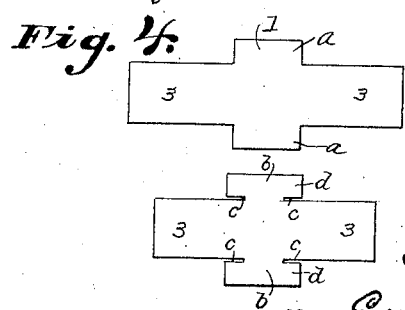
Fig. 4 is a plan view of a set of superposed blanks from which my improved bearing is formed, these blanks being similar in form, but varying in dimensions, as indicated by said view.

The upper member of my improved journal is formed from the upper blank illustrated in Fig. 4 by upsetting the central portion to form an arcuate bearing member 1 connected with the end portions of the blank by a set of substantially vertical legs 2, corresponding in width to that of the end portions 3. The portions —a— of the blank constitute extensions 4 of the arcuate, central portion, when the latter is upset as above described. The arcuate, central portion 1, and its extensions 4, preferably constitutes substantially a half cylinder, although the end portions 4 may be slightly less than a half cylinder.

Figure 1:
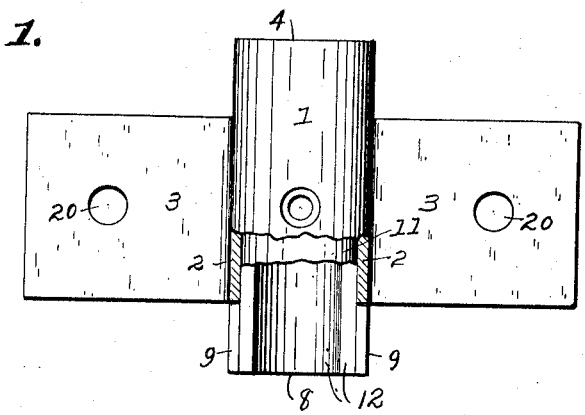
Figure 1 is a top view of my improved bearing, partly broken away in horizontal section, exposing one end of the lower bearing member in plan.
Figure 2:
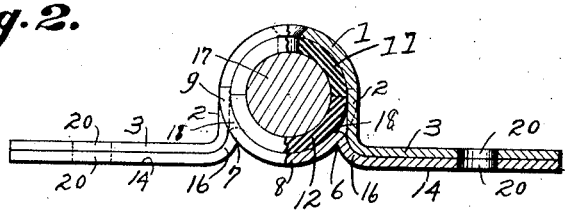
Fig. 2 is an elevation, with a portion shown in central, vertical section, and with the bushing in place.
Figure 3:
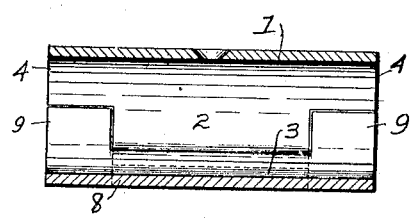
Fig. 3 is a central, vertical, longitudinal sectional view with the bushing removed.

The lower blank shown in Fig. 4 is upset along transverse lines on opposite sides of the center, as indicated at 6 and 7 in Fig. 2, the portions of the blank between the points 6 and 7 being shaped in the arc of a circle corresponding with the circle of which the arcuate portion 1 forms a part. The lateral extensions —b— on the lower blank are partially severed from the central portion by slits —c— forming wings —d— which are upset in the shaping press which forms the arcuate portion 8, and these wings —d— constitute extensions 9 at each end of the bearing. The dimensions of such extensions are sufficient to complete the circle in which the extensions 4 of the bearing member lie. These extensions of the upper and lower members are substantially semi-cylindrical in form, although, as above stated, the extensions of the uppper member are preferably slightly less than a half cylinder, while those of the lower member are slightly greater than a half cylinder, the difference, however, being just sufficient to break joints with the lining or bushing members 11 and 12 of semi-cylindrical form.

The end portions 3 of the plates or blanks from which the upper member of my improved bearing is formed are flat and adapted to rest in a flat, superposed position upon the end portions 14 of the lower member of the bearing. The part of the lower member between the points 6 and 7 and the flat end portions 14 are concavely rounded, as indicated at 16 to form seats for the lower ends of the legs 2 of the central portion of the bearing member where said legs connect with the flat portions 3 in the form of a rounded elbow.

It will be observed that, when the bushing members 11 and 12 are employed, the ends of these bushing members are supported at all points by the cylindrical casing formed by the end extensions 4 and 8, including the upturned wings 9 which constitute continuations of the arcuate member 8, and the upper margins of which are in abutting contact with the lower margins of the extensions 4 on the upper member. Therefore, a shaft 17 inclosed by the bushings 11 and 12 will have no tendency to press the soft metal of which the bushings are composed, into the recesses between the legs 2 and the bushings below the horizontal, central plane of the bearing, the shaft and the bushings being supported by the cylindrical end portions of the sheet metal members.

Similarly, if the bushings are omitted, there will be no greater tendency for the bearing to wear out of true than is the case with any ordinary bearing, since the ends of my improved bearing are cylindrical and prevent the shaft from pressing into the cavity between it and the legs 2. In most bearings, the principal wear is on the under side, and, in my improved bearing, the arcuate portion 8 is extended throughout the length of the bearing, (i. e., from one side of the blank to the other). Therefore, on the underside, the wearing surface is at the maximum and the cylindrical ends are merely required to prevent the shaft from developing a vibratory tendency in the direction of the legs 2, which would be permitted in the bearing disclosed in my former patent, and which would otherwise cause the bearing to wear out of round.

The cavities 18 formed between the legs 2 and the bushing 12 may serve as receptacles for a solid, or semi-solid lubricant. An ordinary oil hole may also be provided, this hole extending through the bearing and through the bushing 11. The end plates 3 and 14 may each be provided with one or more apertures 20 to receive a clamping bolt or screw, whereby these two bearing members may be clamped together, or to a supporting member.

I claim:

1. A bearing, comprising the combination of two sheet metal plates having their central portions circularly curved to form top and bottom members of the bearing and extending from said curved portions outwardly on each side of the bearing in the form of flat, superposed leaves, each of said curved members having end extensions constituting continuations of said curved portions and having their edge margins abutting at the sides of the bearing.

2. A bearing, comprising the combination of two superposed, sheet metal plates, flat at their respective ends, each having lateral extensions of the central portions substantially semi-cylindrical in form, and arranged with their edge margins abutting, the central portions of said plates being also curved in the top and bottom arc of the cylinder defined by the extensions, and bent outwardly from the surface of the cylinder at each side of the bearing to form rounded elbows adapted to allow the flat ends of the plates to bear upon each other.

3. The bearing set forth in claim 2, in which the arcuate central portions are separated at points below the abutting margins of said extensions.

4. The bearing set forth in claim 2, in combination with a bushing clamped between the curved central portions of said members and their extensions.

5. The bearing set forth in claim 2, in which the central portion of the bearing member is curved and extended downwardly across the horizontal plane of the central axis of the flat end portions of the lower member, and in which the lower member has the center of its arcuate portion in substantially the same plane as its flat end portions.

In testimony whereof I affix my signature in the presence of two witnesses.

GUNDER O. BERGLAND.

Witnesses:
A. C. BRICTSON,
FRANCIS H. CORY.